US006185429B1

(12) United States Patent
Gehrke et al.

(10) Patent No.: US 6,185,429 B1
(45) Date of Patent: Feb. 6, 2001

(54) METHOD AND APPARATUS FOR PERFORMING A TIME SYNCHRONIZATION OF A BASE SITE

(75) Inventors: James K. Gehrke, Lake in the Hills; Timothy J. Groch, South Elgin; Steven P. Shipton, Palatine; Mark G. Spiotta, Wheaton, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/127,484

(22) Filed: Jul. 31, 1998

(51) Int. Cl.[7] .................................................. H04B 1/00
(52) U.S. Cl. ............................................ 455/502; 455/561
(58) Field of Search .................................... 455/502, 503, 455/226.1, 561, 92, 424

(56) References Cited

U.S. PATENT DOCUMENTS

| | | | |
|---|---|---|---|
| 5,128,925 | * | 7/1992 | Dornstetter .............................. 370/17 |
| 5,293,645 | | 3/1994 | Sood ..................................... 455/54.1 |
| 5,519,759 | * | 5/1996 | Heineck .................................. 379/59 |
| 5,722,081 | * | 2/1998 | Tamura ................................ 455/502 |
| 5,872,774 | * | 2/1999 | Wheatley ............................. 370/335 |
| 5,875,402 | * | 2/1999 | Yamawaki ............................ 455/502 |

\* cited by examiner

*Primary Examiner*—Daniel S. Hunter
*Assistant Examiner*—Nick Corsaro
(74) *Attorney, Agent, or Firm*—Steven A. May; Daniel C. Crilly; Jeffrey K. Jacobs

(57) ABSTRACT

An unsynchronized base site (104) transmits a time synchronization request to a communication unit (110). A time synchronization error, or a timing offset, for the unsynchronized base site (104) is then determined and transmitted back to the unsynchronized base site (104) to enable the unsynchronized base site to synchronize itself. The time synchronization error is determined for the unsynchronized base site (104) based on the time difference of arrival of the signals received by the communication unit (110) from the base site (104) and at least one synchronized base site (101), the location of the communication unit (110), the location of the base site (104), and the location of the at least one synchronized base site (101).

13 Claims, 3 Drawing Sheets

METHOD AND APPARATUS FOR PERFORMING A TIME SYNCHRONIZATION OF A BASE SITE

FIELD OF THE INVENTION

The present invention relates generally to radio communication systems and, in particular, to performing a time synchronization of a base site in a radio communication system.

BACKGROUND OF THE INVENTION

Radio communication systems are known in which a communication unit, such as a mobile or a portable radio, wirelessly communicates with a fixed infrastructure comprising multiple geographically-diverse base sites. Each base site comprises one or more base stations along with other items of equipment. In the design of such a system, the base sites are geographically located in such a way as to minimize the likelihood that wireless communications between a communication unit and a base site will degrade below a desired minimum level of signal quality.

As a communication unit roams throughout the radio communication system, a system controller, such as a base site controller, assigns a base site to serve the communication unit. In selecting a base site, the system controller analyzes a variety of factors, such as the downlink carrier-to-interference plus noise ratio (C/I+N) of the signals received by the communication unit from several base sites and the uplink C/I+N of the signals received by the base sites from the communication unit. The system controller then typically assigns the base site yielding the best uplink and downlink C/I+N to serve the communication unit, assuming the base site has communication channels available. As the communication unit roams from the service coverage area of one base site to the service coverage area of another base site, the system controller typically arranges for a "hand off" of communication service from the currently serving base site to the base site providing communication service to the service coverage area that the communication unit is entering once the C/I+N for the former base site degrades below a preset threshold and the C/I+N for the latter base site is at or above the preset threshold with respect to the communication unit. This handoff must be seamless and transparent to the user of the communication unit (i.e., the communications must appear to continue uninterrupted and no information can be lost as communication service is transferred among base sites).

In a time division multiple access (TDMA) radio communication system, information is transmitted within assigned time slots to and from each communication unit. For proper operation, all of the communication units and base sites in the system must be synchronized in time. While communication units automatically synchronize to the base sites, all base sites must be accurately synchronized to each other to allow a communication unit to handoff between base sites without a loss of information.

Base site time synchronization is also used to control the time of launch of a location beacon that the communication units can use to measure time differences of arrival of the beacon signal from the base sites. Time difference of arrival information from at least three sites, along with base site position information, can be used to calculate a communication unit's location.

One method of time synchronization of the base sites' timing references is to connect the base sites, via T1 or E1 links, to a master synchronization unit that generates a common time base. However, highly accurate time synchronization cannot be reliably obtained by sending a signal over T1/E1 links due to differences in inbound and outbound delays when a T1/E1 link that interconnects two base sites, but is not dedicated to time synchronization, is routed through a switch (i.e., when using a T1/E1 link, the inbound signals may travel a different path from the outbound signals and will incur different propagation delays).

A second, more accurate method of time synchronization uses a global positioning system (GPS) satellite and GPS receivers as a source of a common time base. All base sites within the coverage area of a GPS satellite can synchronize to a highly stable and accurate GPS signal from the GPS satellite. However, GPS synchronization is not an available option for base sites that are not within the coverage area of a GPS satellite, such as base sites located deep in a tunnel or base sites located in the interior of a large office building and which lack access to a roof top antenna.

Once a base site is synchronized, it is able to maintain the timing reference by use of a local oscillator. Any lack of stability in the oscillator can be periodically corrected by resynchronizing with the GPS signal or through periodic corrections of the oscillator based on known drift in the oscillator performance. In the latter case, a base site might still occasionally have to resynchronize with a common time base. However, if a base site shuts down completely, for example due to a power outage or for maintenance purposes, it will need to be time synchronized when powered back up. If such a base site is not within the coverage area of a GPS satellite, it can be manually synchronized by bringing a high stability clock, such as a rubidium clock, to the site. However, manual synchronization will not work if the site is being remotely restarted, and is not practical if such a site needs to periodically resynchronize by reference to a common time base.

Therefore, a need exists for a method and apparatus for performing a highly accurate time synchronization of a base site that is not within the coverage area of a GPS satellite.

DESCRIPTION OF A PREFERRED EMBODIMENT

Generally, the present invention encompasses a method and apparatus for performing a time synchronization of a base site. A radio communication system includes multiple base sites, at least one communication unit, a controller, and a location-determining device. An unsynchronized (with respect to its timing reference) base site requests a time synchronization calibration. A communication unit, such as a mobile or portable radio, located within the coverage area of the unsynchronized base site receives the time synchronization calibration request. In response to the request, the communication unit sends to the controller time difference of arrival (TDOA) information with respect to signals that the communication unit received from the unsynchronized base site and at least one time synchronized base site. The controller obtains the geographical locations of the multiple base sites from the location-determining device, and determines the geographical location of the communication unit and measured and expected time differences of arrival of signals received by the communication unit from the unsynchronized base site and the one or more time synchronized base sites. The controller then determines a timing offset, or time synchronization error, between the expected TDOA and the measured TDOA for the signals received at the communication unit from the unsynchronized base site and one or more time synchronized base sites. The time synchronization error is transmitted back to the unsynchronized base site, which then uses the error to synchronize itself. By synchronizing a base site in this manner, the present invention permits base sites that are not within the coverage area of a GPS satellite and would otherwise be unable to be synchronized in a highly accurate manner, to get synchronized in a highly accurate manner with the aid of a communication unit that has access to both the unsynchronized base site and at least one synchronized base site.

Figure 1:
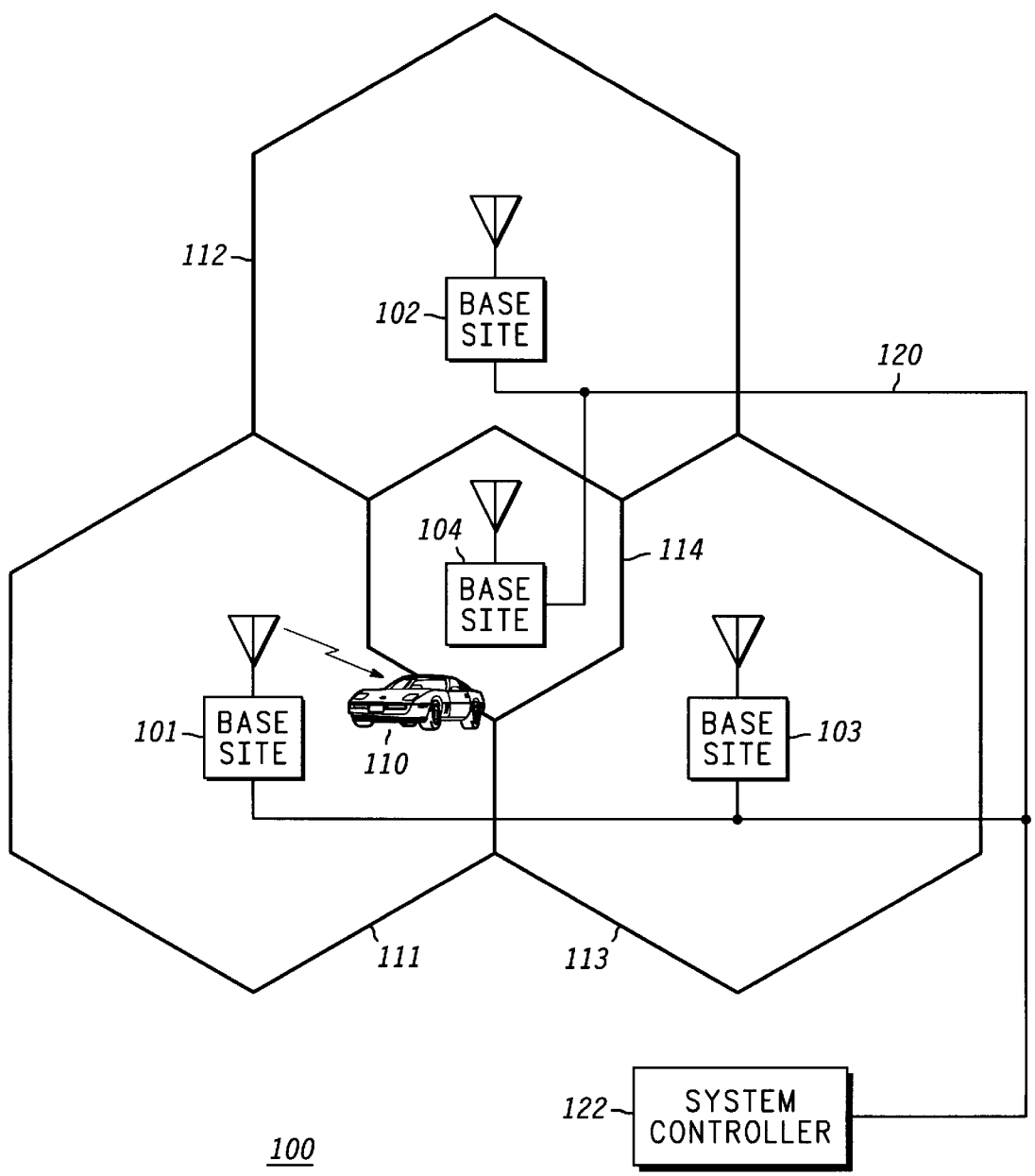
FIG. 1 is a block diagram illustration of a radio communication system in accordance with a preferred embodiment of the present invention.

The present invention can be more fully understood with reference to FIGS. 1–5. FIG. 1 is a block diagram of a radio communication system 100 in accordance with a preferred embodiment of the present invention. The preferred radio communication system 100 comprises geographically-diverse base sites 101–104 (four shown) that are coupled to each other and to a system controller 122 via a network 120, such as dedicated T1 phone lines or microwave links. The system also comprises a plurality of communication units 110, only one of which is shown in FIG. 1.

Figure 2:
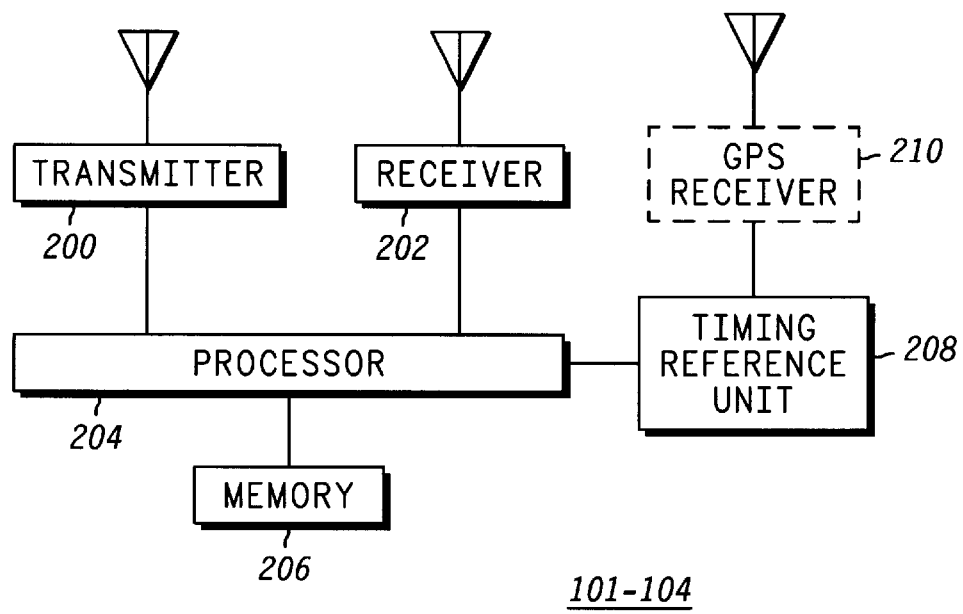
FIG. 2 is a block diagram illustration of a base site in accordance with a preferred embodiment of the present invention.

The base sites 101–104 preferably comprise "iDEN" Enhanced Base Transceiver Sites (EBTS's) that are commercially available from Motorola, Inc. of Schaumburg, Illinois. Each base site 101–104 provides communication service to a respective service coverage area 111–114. As shown in FIG. 2, each of the base sites 101–104 preferably includes a transmitter 200, a receiver 202, a memory 206, and a processor 204 that allow the respective base site 101–104 to store information, make computations, and run software programs. Each base site 101–104 also includes a timing reference unit 208 that provides a timing reference for the base site 101–104. In the preferred embodiment, base sites 101–103 further include a Global Positioning Satellite (GPS) receiver 210 that is coupled to the timing reference unit 208. A GPS receiver is unnecessary at base site 104 because, as discussed below, it is presumed to be blocked from, or outside of, the coverage area of GPS satellites for the purposes of the present invention.

Figure 3:
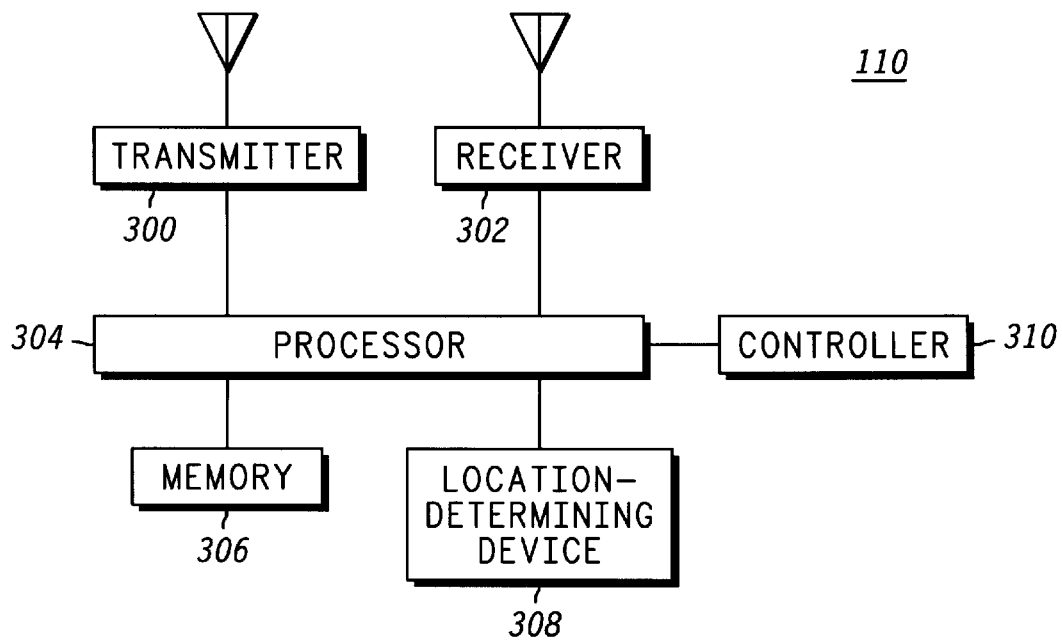
FIG. 3 is a block diagram illustration of a communication unit in accordance with a preferred embodiment of the present invention.

The system controller 122 comprises memory and a processor that allows the controller 122 to store data and make computations, among other things. The communication unit 110 preferably comprises an "iDEN" radiotelephone and, as shown in FIG. 3, preferably includes a transmitter 300, a receiver 302, a memory 306, a processor 304, a location-determining device 308, and a controller 310. The location-determining device 308 preferably comprises a memory device, such as a random access memory (RAM), in which is stored a database of the locations of all of the base sites 101–104 in the system 100. The four base sites 101–104, the system controller 122, and the network 120 are collectively referred to as a fixed infrastructure. Being fixed in place, the precise location of each base site 101–104 is known with high accuracy as determined by surveying or other methods of geographic location determination.

As the communication unit 110 roams throughout the system 100, the system controller 122 assigns a base site (e.g., base site 101) to serve as a serving base site for the communication unit 110. The serving base site 101 manages and provides radio communication services for the communication unit 110 while the communication unit is located in the serving base site's service coverage area 111.

For the purpose of illustrating the present invention, it is assumed that three base sites (e.g., base sites 101–103) have access to a common time base which each base site 101–103 uses to synchronize its timing reference unit 208. In the preferred embodiment, the common time base is provided by the GPS receiver 210 at each base site 101–103, which GPS receiver 210 has access to a GPS satellite signal. One base site (e.g., base site 104) lacks access to the common time base. Base site 104 could be a smaller base site meant to fill in a so-called "hole" in the coverage provided by the other base sites 101–103. For example, base site 104 might be located deep in a tunnel or in the interior of a large office building. Due to its physical location, base site 104 lacks access to the GPS satellite signal serving as a reference for the GPS receivers 210 of the other base sites 101–103.

Those of ordinary skill in the art will appreciate that there are other methods of supplying a highly accurate common time base to the base sites 101–103, such as a synchronization unit that is connected to the base sites via a dedicated T1 link that is a part of the network 120 and that is dedicated to time synchronization, which synchronization unit generates a common time base and supplies the common time base to the base sites via the T1 link. Accordingly, such other methods of supplying a common time base may be used without departing from the spirit and scope of the present invention.

In the preferred embodiment, at any particular moment, the location of the communication unit 110 can be determined by reference to at least three time synchronized base sites (e.g., base sites 101–103). To determine communication unit location, the base sites 101–103 transmit signals to the communication unit 110. Each signal includes an identifier, such as an identifying sequence of symbols, that uniquely corresponds to the base site 101–103 transmitting the respective signal. Each signal also includes a time of transmission indication relative to the common time base. For example, in Motorola's "iDEN" radio communication system, which is a time division multiple access (TDMA) system, a structure of sequentially numbered time slots is provided throughout the system. Since the transmitting base sites 101–103 are time synchronized to a common time base, the integrity of the time slot structure is maintained with high accuracy. Given that all time slots are of equal duration, the communication unit 110 is provided with information regarding when the time slot was transmitted. In effect, the time slot number functions as a time of transmission indication relative to the common time base. Upon receiving the signals from the base sites 101–103, the communication unit 110 determines the time of transmission (e.g., the time slot number) of each signal.

The communication unit 110 also determines time of arrival indications for each of the signals received from the base sites 101–104. Since each of the signals includes a known sequence of symbols that uniquely corresponds to the base site 101–104 transmitting the respective signal (e.g., the identifier), the communication unit 110 performs a running correlation between a received sequence of symbols and the known sequences of symbols. When a high correlation is found, indicating that a known sequence has been received, the time is noted relative to which slot number provided the relevant symbols. Since the time slot structure is maintained with high accuracy relative to the common time base, a time of arrival can be determined. In order to determine exactly when the relevant symbols were received, compensations can be made to account for the amount of known processing delay in the communication unit 110 (e.g., the amount of time necessary to demodulate the symbols and compute the correlations).

The communication unit 110 routes time of transmission and time of arrival information for the three time synchronized base sites 101–103, along with time of arrival information for signals received by the communication unit 110 from the unsynchronized base site 104, to the controller 310. The communication unit 110 also routes to the controller 310 location information from the location-determining device 308 with respect to the three synchronized base sites 101–103 and the unsynchronized base site 104.

Upon receiving the time of transmission and time of arrival information, the controller 310 uses a weighted least-squares approach to derive the location of the communication unit 110. Since distance is the product of velocity and time, the propagation delays of the signals transmitted by the three base sites 101–103 and received by the communication unit 110 can be used to estimate the distances, D1, D2, and D3, from the communication unit 110 to each of the three base sites 101–103, respectively. Time differences of arrival of the signals received by the communication unit 110 from the three base sites 101–103 are calculated and the location of the communication unit 110 is determined using time of arrival variances, time differences of arrival variances, and a weighted least-squares solution per the technique disclosed in detail in U.S. patent application Ser. No. 08/792,331, entitled METHOD AND APPARATUS FOR COVARIANCE MATRIX ESTIMATION IN A WEIGHTED LEAST-SQUARES LOCATION SOLUTION, filed Jan. 31, 1997, and assigned to the assignee of the present invention and hereby incorporated by reference herein.

In an alternate embodiment of the present invention, the communication unit 110 transmits time of transmission and time of arrival information for the three time synchronized base sites 101–103, along with time of arrival information for signals received by the communication unit 110 from the unsynchronized base site 104, to the system controller 122 via the serving base site 101. The communication unit 110 also transmits, to the system controller 122, location information from the location-determining device 308 with respect to the three synchronized base sites 101–103 and the unsynchronized base site 104.

In the alternate embodiment, upon receiving the time of transmission, time of arrival, and location information, the system controller 122 uses the aforementioned weighted least-squares approach to derive the location of the communication unit 110.

Once the location of the communication unit 110 is determined, then the distance, D4, from the communication unit 110 to the unsynchronized base site 104 is calculated by the appropriate controller 122, 310. Next, an expected time difference of arrival (Expected_TDOA) at the communication unit 110 of signals transmitted from the unsynchronized base site 104 and from any one of the three synchronized base sites 101–103 (e.g., base site 101) is calculated by the appropriate controller 122, 310 according to the following equation:

$$\text{Expected\_TDOA14} = (D1-D4)/(\text{speed of light})$$

Expected_TDOA14 is the expected time difference of arrival (TDOA) for signals received by the communication unit 110 from base sites 101 and 104. For example, if D1 (the distance from the communication unit 110 to base site 101) is determined to be 'A' meters and D4 (the distance from the communication unit 110 to base site 104) is calculated to be 'B' meters then the Expected_TDOA14=$10^9$ * (A−B meters)/($3\times10^8$ meters/second)='F' nanoseconds (ns).

After the expected TDOA for signals transmitted by the unsynchronized base site 104 and a synchronized base site 101 are calculated, the time synchronization error for the unsynchronized base site 104 is determined by the appropriate controller 122, 310 according to the following equation:

Time synchronization error=Expected_TDOA14−TDOA14, where TDOA14 is the measured time difference of arrival for signals received by the communication unit 110 from base sites 101 and 104.

For example, if the propagation delay of signals transmitted by base site 101 and received by the communication unit 110 is determined to be 'X' ns and the propagation delay of the signal transmitted by base site 104 and received by the communication unit 110 is determined to be 'Y' ns, then TDOA14=X−Y ns. This is compared to the Expected_TDOA14 of 'F' ns, with a resulting time synchronization error=F−(X−Y) ns='Z' ns. In the preferred embodiment, the time synchronization error of 'Z' ns is transmitted from the communication unit 110 to the unsynchronized base site 104, and the unsynchronized base site 104 then synchronizes its clock per the time synchronization error. Alternatively, the time synchronization error of 'Z' ns is transmitted from the controller 122 to the unsynchronized base site 104 via the communication unit 110. In yet another alternative, the time synchronization error is transmitted from the controller 122 to the unsynchronized base site 104 via the network 120. By using the present invention, the out-of-GPS coverage base site 104 could then resynchronize its clock using this apparatus every time a communication unit passed nearby, to thereby remain substantially in synchronization with the other base sites 101–103 in the system 100.

In an alternate embodiment of the radio communication system 100, the location-determining device 308 might be coupled to the controller 122 and to the network 120 and be part of the fixed infrastructure. In this case, the system controller 122 queries the location-determining device 308 to obtain the location of the base sites 101–103 prior to computing the communication unit's 110 location. One such approach for determining communication unit location based on TDOA information received from a communication device and base site locations obtained from an infrastructure location database is described in detail in U.S. Pat. No. 5,293,645, issued to Sood, hereby incorporated by reference herein. In general, this technique involves the communication unit receiving signals transmitted by three time synchronized base sites whose locations are already known, the communication unit transmitting back to a base site in the fixed infrastructure the relative propagation delays of the signals transmitted by the three base sites, and then the controller, with reference to the location-determining device, using triangulation or other geographical intersection technique to determine the location of the communication unit.

In a second alternate embodiment of the radio communication system 100, the location of the communication unit 110 might be determined by reference to only two time synchronized base sites. In this embodiment, the two synchronized base sites (e.g., base sites 101 and 102), and unsynchronized base site 104 transmit signals to the communication unit 110. Each of the signals includes an identifier, such as an identifying sequence of symbols, that uniquely corresponds to the base site transmitting it, and each signal includes a time of transmission indication relative to the common time base.

The communication unit 110 determines time of transmission and time of arrival information for the two synchronized base sites 101, 102 as described above and routes the time of transmission and time of arrival information, along with time of arrival information for signals received by the communication unit from the unsynchronized base site 104, to the controller 310. The communication unit 110 also queries the location-determining device 308 to determine the locations of the of the base sites 101, 102, 104 and routes the locations of the base sites 101, 102, 104 to the controller 310.

The controller 310 then uses a weighted least-squares approach to derive the location of the communication unit 110. The preferred method for estimating the location of the communication unit 110 based on only two base site locations is described in detail in U.S. patent application Ser. No. 08/846,751, entitled METHOD FOR ESTIMATING A LOCATION OF A MOBILE UNIT BASED ON AT LEAST TWO FIXED TRANSCEIVERS, filed Apr. 30, 1997, and assigned to the assignee of the present invention and hereby incorporated by reference herein. The two base site approach uses estimates of the distance from the communication unit 110 to each of the two time synchronized base sites 101, 102 and time differences of arrival calculations with respect to signals transmitted from the base sites 101, 102 to the communication unit 110 to estimate the location of the communication unit 110.

Once the location of the communication unit 110 is determined by the controller 310, the time synchronization error is determined and conveyed to the unsynchronized base site 104 as described above.

In a third alternate embodiment of the radio communication system 100, the location of the communication unit 110 might be determined without reference to any base site. In this alternate embodiment, the communication unit 110 further includes a GPS receiver. The communication unit 110 employs the GPS receiver to receive signals from at least three of a constellation of GPS satellites and then determines its own location in accordance with known techniques of triangulation as applied to GPS systems. The communication unit 110 also receives signals transmitted from at least one time synchronized base site (e.g., base site 101) and from the unsynchronized base site 104 and routes the time of transmission for the signals from the synchronized base site 101 and the times of arrival for signals from both base sites 101, 104, along with the locations of both base sites 101, 104 and the communication unit 110, to the controller 310. Once the controller 310 receives such information from the communication unit 110, the controller 310 determines the time synchronization error and conveys it to the unsynchronized base site 104 as described above.

Although described above with respect to determining the time synchronization error in the communication unit 110, the second and third alternate embodiments of the radio communication system 100 might determine the time synchronization error in the fixed infrastructure. In such event, the communication unit 110 transmits the time of transmission, time of arrival, and location information to the system controller 122 via the serving base site 101. The system controller 122 determines the time synchronization error as described above and conveys the time synchronization error to the unsynchronized base site 104 via the communication unit 110.

As described above, the present invention provides for an unsynchronized base site 104 to accurately synchronize with GPS-synchronized base sites without itself receiving a GPS satellite signal. The unsynchronized base site 104 synchronizes itself based on a time synchronization error that is determined by the radio communication system 100 and then transmitted back to the unsynchronized base site 104. The time synchronization error is determined from measured and expected TDOA determinations with respect to signals transmitted to a communication unit 110 from the unsynchronized base site 104 and from at least one time synchronized base site. In order to determine an expected TDOA, the location of the communication unit 110 must be determined. Determination of the location of the communication unit 110 is accomplished by the use signals received by the communication unit 110 from two or three time synchronized base sites or by self-determination. The location and time synchronization error determinations are performed by a controller 310 located in the communication unit 110 or, alternatively, by a controller 122 located in the fixed infrastructure, utilizing location information provided by a location-determining device 308 that, in the preferred embodiment, is a part of the communication unit 110.

Figure 4:
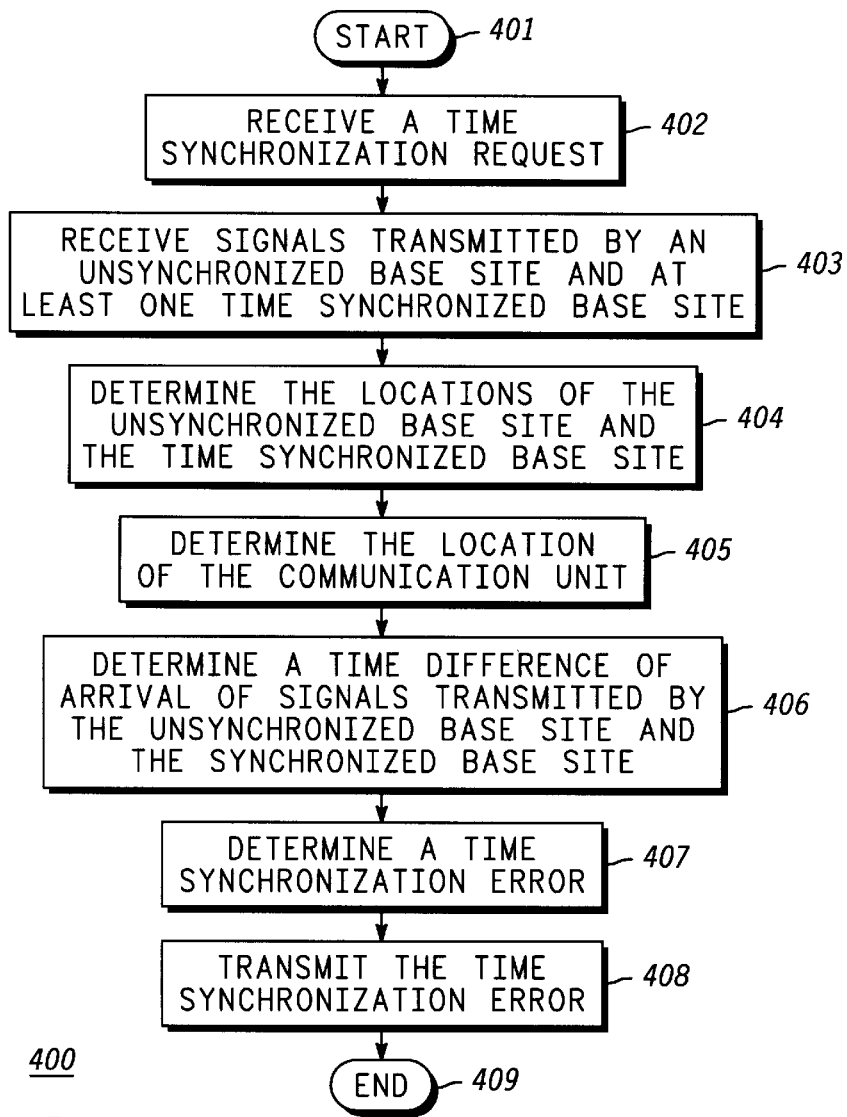
FIG. 4 is a logic flow diagram of steps executed by a communication system for performing a time synchronization of a base site in accordance with the present invention.

FIG. 4 illustrates a logic flow diagram 400 of steps executed by a radio communication system for performing a time synchronization of a base site in accordance with a preferred embodiment of the present invention. The logic flow begins (400) when a communication unit receives (401) a time synchronization request from a base site in need of synchronization (e.g., a base site that has not been synchronized or a base site that has lost its synchronization). In addition, the communication unit receives (402) signals transmitted from the unsynchronized base site and at least a second, synchronized base site. The locations of the synchronized and unsynchronized base sites are then determined (403), preferably by the communication unit or alternatively by a fixed infrastructure of the radio communication system. The determination of the locations of the base sites is preferably accomplished by querying a database in a location-determining device.

In the preferred embodiment of the present invention, the step of determining (404) the location of the communication unit is performed by the communication unit based on time differences of arrival of signals received by the communication unit from three synchronized base sites and on reference to the locations of the synchronized base sites. Alternatively, the step of determining (404) the location of the communication unit might be performed by the fixed infrastructure. The location determination is preferably made by utilizing the weighted least-squares approach described in detail in U.S. patent application Ser. No. 08/792,331, entitled METHOD AND APPARATUS FOR COVARIANCE MATRIX ESTIMATION IN A WEIGHTED LEAST-SQUARES LOCATION SOLUTION, filed Jan. 31, 1997, and assigned to the assignee of the present invention and hereby incorporated by reference herein. Alternative methods of determining the geographical location of the communication unit may be utilized without departing from the spirit and scope of the present invention.

The radio communication system, preferably a controller in the communication unit, determines (405) a TDOA of a signal transmitted from the base site and a signal transmitted from the second base site. The radio communication system, preferably the controller, then determines (406) a time synchronization error for the base site based on the difference between the determined TDOA and an expected TDOA. The expected TDOA is determined based on the locations of the communication unit and the base sites. The radio communication system transmits (407) the time synchronization error to the base site so that it may synchronize itself, and the logic flow ends (408).

As described above, a method is provided for performing a time synchronization of an unsynchronized base site that eliminates the inaccuracies of synchronizing over a non-dedicated T1 link and wherein the unsynchronized base site need not receive a signal from a GPS satellite. The method is initiated when a communication unit receives a request for a time synchronization. The locations of the communication unit, the unsynchronized base site, and a time synchronized base site are determined. A measured and expected TDOA are determined and compared and the product of this comparison is a time synchronization error, or timing offset, that is then transmitted back to the unsynchronized base site.

Figure 5:
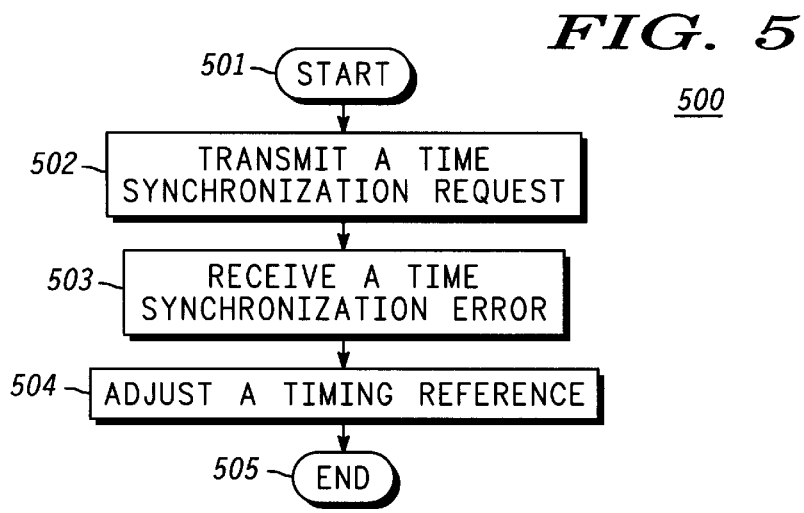
FIG. 5 is a logic flow diagram of steps executed by a base site for performing a time synchronization in accordance with the present invention.

FIG. 5 illustrates a logic flow diagram 500 executed by a base site for performing a time synchronization of the base site in accordance with a preferred embodiment of the present invention. The logic flow begins (500) when the base site transmits (501) a time synchronization request to a communication unit. For example, the request could comprise a predetermined sequence of symbols in a predetermined location in the transmission indicating that the base site needs to be synchronized. In response to this request, the radio communication system determines (502) a time synchronization error for the base site and then transmits the time synchronization error back to the base site, preferably via the communication unit. In an alternate embodiment, the time synchronization error is transmitted back to the base site over a network linking the fixed infrastructure of which the base site is a part. The base site adjusts (503) its timing reference in accordance with the received time synchronization error, and the logic flow ends (504).

Generally, the present invention encompasses a method and apparatus for performing highly accurate time synchronization of an unsynchronized base site that lacks access to a highly accurate common time base. Highly accurate time synchronization of a base site is required in a time division multiple access (TDMA) communication system to insure that no time slots get lost when a communication unit is handed off between base sites. Highly accurate time synchronization is also a prerequisite for determining an accurate location of a communication unit based on time differences of arrival of signals received by the communication unit from multiple base sites. For example, such accurate time synchronization is accomplished by using a GPS satellite and a GPS receiver as a source of a common time base. But this presents the problem of how to synchronize, and periodically resynchronize, an unsynchronized base site that is not within the coverage area of a GPS satellite. The present invention overcomes that problem by utilizing a communication unit that is roaming through the service coverage area of the unsynchronized base site. A communication system determines a time synchronization error for the unsynchronized base site, the time synchronization error determination being based on time differences of arrival of signals received by the communication unit from the unsynchronized base site and from a time synchronized base site. The time synchronization error is transmitted to the unsynchronized base site and the unsynchronized base site uses the time synchronization error to synchronize itself and to synchronize indirectly to the common time base.

While the present invention has been particularly shown and described with reference to particular embodiments thereof, it will be understood by those skilled in the art that various changes in form and details may be made therein without departing from the spirit and scope of the present invention.

We claim:

1. A communication system comprising:

a base site that transmits a time synchronization calibration request;

a communication unit including:
 a receiver to receive the time synchronization calibration request; and
 a transmitter to transmit time difference of arrival information to a controller;

at least a second base site to transmit a radio frequency signal to the communication unit and to receive a radio frequency signal from the communication unit;

a location-determining device to determine a location of the base site and a location of the at least a second base site; and a controller to determine the location of the communication unit and to calculate time synchronization error for the base site, wherein the controller calculates the time synchronization error according to the following equations:

Expected TDOA12=(D1−D2)/(speed of light)

Time synchronization error=Expected TDOA12−TDOA12 wherein:

D1 is a distance from the location of the communication unit to the location of the at least a second base site;

D2 is a distance from the location of the communication unit to the location of the base site;

Expected TDOA12 is an expected time difference of arrival for signals received by the communication unit from the base site and the at least a second base site;

TDOA12 is a measured time difference of arrival for signals transmitted to the communication unit by the base site and by the at cast a second base site; and Time synchronization error is an amount of time by which a timing reference of the base site is offset from a timing reference of the at least a second base site.

2. The communication system of claim 1, wherein the at least a second base site comprises a second base site and a third base site.

3. The communication system of claim 1, wherein the at least a second base site comprises a second base site, a third base site, and a fourth base site.

4. The communication system of claim 1, wherein the location-determining device that comprises a database that includes the location of the base site and the location of the at least a second base site.

5. The communication system of claim 1, wherein the location-determining device is contained within the communication unit.

6. The communication system of claim 1, wherein the controller is contained within the communication unit.

7. A method for time synchronization of a base site comprising the steps of:

receiving, by a communication unit, a time synchronization request for the base site;

receiving, by the communication unit, signals transmitted by the base site and by at least a second base site;

determining a location of the base site and a location of the at least a second base site;

determining a location of the communication unit;

determining a time difference of arrival of a signal transmitted from the base site to the communication unit and a signal transmitted from the at least a second base site to the communication unit;

determining a time synchronization error for the base site based on the time difference of arrival of the signals from the base site and the at least a second base site, the location of the communication unit, and the location of the base site, and the location of the at least a second base site; and providing the time synchronization error to the base site, wherein the step of determining the time synchronization error for the base site comprises the step of calculating the time synchronization error according to the following equations:

Expected TDOA12=(D1−D2)/(speed of light)

Time synchronization error=Expected TDOA12−TDOA12 wherein:

D1 is a distance from the location of the communication unit to the location of the at least a second base site;

D2 is a distance from the location of the communication unit to the location of the base site;

Expected TDOA12 is an expected time difference of arrival for signals received by the communication unit from the base site and the at least a second base site;

TDOA12 is a measured time difference of arrival for signals transmitted to the communication unit by the base site and by the at least a second base site; and Time synchronization error is an amount of time by which a timing reference of the base site is offset from a timing reference of the at least a second base site.

8. The method of claim 7, wherein the step of determining a location of the base site and a location of the at least a second base site comprises the step of determining locations of the base site, a second base site, a third base site, and a fourth base site.

9. The method of claim 8, wherein the step of determining the location of the communication unit comprises the step of determining the location of the communication unit based on signals received by the communication unit from the second base site, the third base site, and the fourth base site and locations of the base site, the second base site, the third base site, and the fourth base site.

10. The method of claim 7, wherein the step of determining a location of the base site and a location of the at least a second base site comprises the step of querying a database in a locationdetermining device.

11. The method of claim 10, wherein the location-determining device is contained in the communication unit.

12. The method of claim 10, wherein the location-determining device is contained in a base site.

13. A method for time synchronization of a base site comprising the steps of:

transmitting, by the base site, a time synchronization request to a communication unit;

receiving, from the communication unit, a time synchronization error; and adjusting a timing reference of the base site based on the time synchronizaton error received from the communication unit, wherein the time synchronization error is defined by the following equations:

Expected TDOA12=(D1−D2)/(speed of light)

Time synchronization error=Expected TDOA12−TDOA12 wherein:

D1 is a distance from a location of the communication unit to a location of a second base site;

D2 is a distance from a location of the communication unit to a location of the base site;

Expected TDOA12 is an expected time difference of arrival for signals received at the communication unit from the base site and the second base site;

TDOA12 is a measured time difference of arrival for signals transmitted to the communication unit by the base site and by the second base site; and Time synchronization error is an amount of time by which the timing reference of the base site is offset from a timing reference of the second base site.

* * * * *

UNITED STATES PATENT AND TRADEMARK OFFICE
CERTIFICATE OF CORRECTION

PATENT NO. : 6,185,429 B1
DATED : February 6, 2001
INVENTOR(S) : Gehrke et al.

Page 1 of 1

It is certified that error appears in the above-identified patent and that said Letters Patent is hereby corrected as shown below:

<u>Column 12,</u>
Line 11, reads "locationdetermining"; should read -- location-determining --

Signed and Sealed this

Twenty-first Day of August, 2001

Attest:

*Attesting Officer*

NICHOLAS P. GODICI
*Acting Director of the United States Patent and Trademark Office*